United States Patent [19]
Jones et al.

[11] Patent Number: 4,732,189
[45] Date of Patent: Mar. 22, 1988

[54] FAST OPENING VALVE

[75] Inventors: Terence V. Jones, Oxford, England; Peter J. Loftus, College Park, Md.

[73] Assignee: The Secretary of State for Defence in Her Britannic Majesty's Government of the United Kingdom of Great Britain and Northern Ireland, London, England

[21] Appl. No.: 860,172

[22] Filed: May 6, 1986

[51] Int. Cl.⁴ .............................................. F16K 31/124
[52] U.S. Cl. .................................... 137/220; 137/221; 137/492; 251/28
[58] Field of Search .............. 137/220, 221, 222, 492, 137/514.3; 251/28, 47, 48

[56] References Cited

U.S. PATENT DOCUMENTS

| | | | |
|---|---|---|---|
| 2,226,031 | 12/1940 | Wahl et al. | 137/222 |
| 2,919,714 | 1/1960 | Mrazek | 137/220 |
| 3,415,269 | 12/1968 | Salerno | 251/35 X |
| 3,515,165 | 6/1970 | Zadoo | 137/220 |

FOREIGN PATENT DOCUMENTS

| | | |
|---|---|---|
| 1044686 | 10/1966 | United Kingdom . |
| 1065842 | 4/1967 | United Kingdom . |
| 1221780 | 2/1971 | United Kingdom . |
| 1228059 | 4/1971 | United Kingdom . |
| 1287206 | 8/1972 | United Kingdom . |
| 1517543 | 7/1978 | United Kingdom . |

Primary Examiner—Gerald A. Michalsky
Attorney, Agent, or Firm—Nixon & Vanderhye

[57] ABSTRACT

A fast opening plug valve especially for release of high pressure gas. The plug has an internal chamber and is held in the closed position by the pressure of gas within this chamber which acts on a fixed wall. The opening stroke is driven by valve inlet pressure upon release of gas from the plug chamber to a dump chamber. Flow from the plug chamber to the dump chamber is choked towards the end of the valve opening cycle to decelerate the plug. Plug acceleration at the start of the opening cycle is commenced prior to opening to minimize the opening period. Release of pressure from the plug chamber may be initiated by action of a slide valve and linked to rise of valve inlet pressure. The valve has application in wind tunnels.

8 Claims, 5 Drawing Figures

FAST OPENING VALVE

The present invention relates to fast opening valves and especially though not exclusively to fast opening valves inteneed to provide a large throughflow in a very short time.

An accurate assessment of heat transfer rates to turbine vanes and blades is an important aspect of efficient cooling system design and component life prediction in gas turbine engines. Techniques have been developed which permit such measurements to be obtained in test rigs which provide short duration steady flow through a turbine cascade in a specialised wind tunnel. In one type of wind tunnel intended for this use a piston is driven along a cylinder pneumatically and at a given moment the gas compressed by the driven piston is released to flow through the wind tunnel to a dump tank. Such a wind tunnel requires a fast opening valve capable of accommodating a large through flow in a very short time without causing turbulence in that flow. It was for such a requirement that the valve of the invention was created.

In a valve which is required to complete its opening movement in the shortest possible time the inertia of the moving masses is important. Valves which are intended for flow rate control or for closure upon an established flow are likely to have an operating mechanism dictated by this duty and such a mechanism is likely to impose a significant inertia penalty when use for fast opening duty is considered. Moreover valves for flow rate control or flow stopping will be constructed such that the inlet pressure either aids the closing movement of the valve or has minimal effection on that movement. These valves will not utilise the inlet pressure to aid the opening movement.

It is an object of the present invention to provide a valve, principally intended for fast opening duty, in which the duration of the opening movement is minimised by minimising the inertia of the system and by utilising the inlet pressure to drive the opening movement. It is a further object of the invention to provide a valve having minimal recoil and shock at the completion of the opening movement by controlled deceleration of the moving parts.

Accordingly the present invention is a fast opening valve comprising an inlet port, an outlet port, a first passage which links said ports, a plug, a plug mounting which permits movement of the plug between a first position thereof in which it closes the first passage and a second position in which it lies clear of the first passage on the outlet port side thereof, a first chamber which lies within the plug, a wall member which bounds one portion of the first chamber and which is fixed in position in relation tot he plug mounting, a second chamber, a second passage which connects the first chamber with the second chamber, a closure means and a choke means both associated with the second passage and operably linked to movement of the plug, and pressurisation means operable to introduce fluid under pressure into the first chamber; whereby pressurisation of the first chamber causes closure of the valve by movement of the plug to the first position in which position the closure means is operable to close the second passage and thereby seal the first chamber and hold the valve closed; whereby opening of the valve is precipitated by release of the pressure within the first chamber by opening of the closure means, and is effected by action of a pressure manifest at the inlet port; and whereby the movement of the plug in its movement from the first position to the second position is decelerated towards the end of that movement by action of the choke means which reduces flow through the second passage to cause a rise in the back pressure in the first chamber.

Preferably there is a sealing portion located in the first passage of the valve, which is engageable with the plug to close the passage, and the plug in the first position thereof extends though the sealing portion so that the closure remains intact for a first part of the movement of the plug from the first position to the second. This enables the plug to accelerate from rest at the closed position, under the action of the pressure at the inlet port, before commencing to open the valve. This pre-acceleration helps to minimise the duration of the opening stage.

Preferably the valve includes an annular slide valve which has a through-bore which defines the second passage and which by activation thereof serves to release the pressure in the first chamber to trigger the opening of the valve. A valve of the invention without such a feature will operate in a self triggering mode and will open when the force upon the plug resulting from the pressure at the inlet port exceeds the counter force from the pressure within the first chamber. Such operation is satisfactory for some uses of the valve but increased flexibility is conferred by the inclusion of the slide valve which permits the opening to be triggered at will. It should be appreciated of course that the valve requires a sufficient pressure at the inlet part to open the valve and should be be utilised for application in which opening is required in the absence of such a pressure.

DESCRIPTION OF A PREFERRED EMBODIMENT

Figure 1:
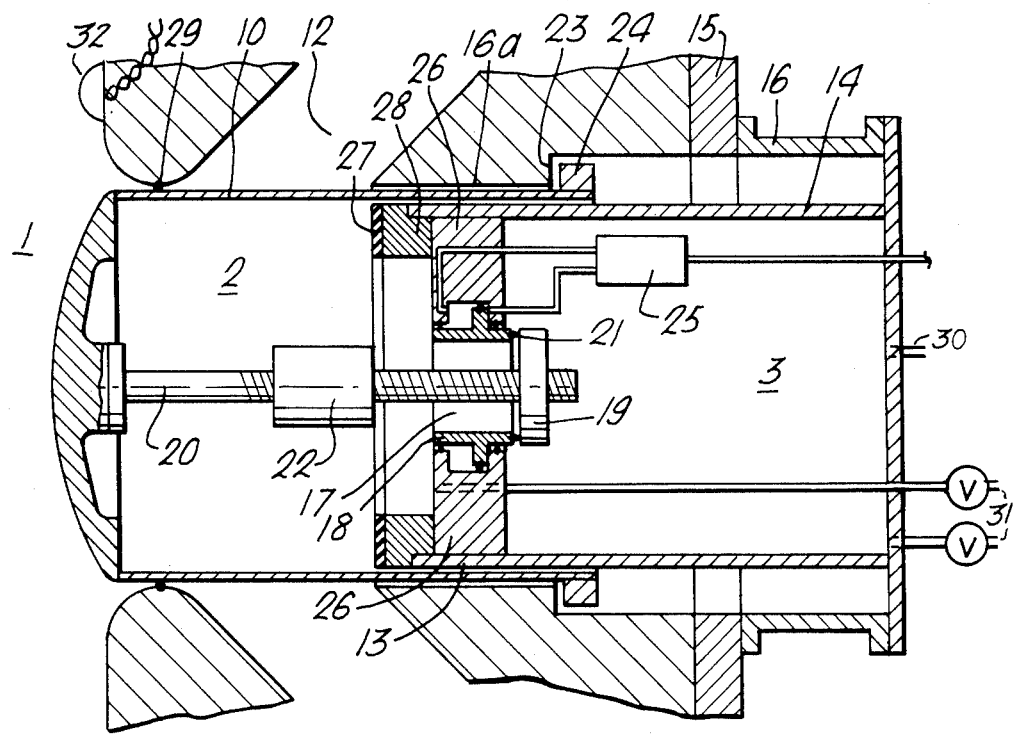
FIG. 1 illustrates a sectional view of the valve in the closed position thereof.

The valve illustrated in the drawings is a pneumatically operated valve used to link a pressure vessel to an annular wind tunnel, the latter being of the specialized variety mentioned earlier in this specification and used for measurement of heat transfer rates in turbine cascases. The valve has an inlet port which is the exit from a pressure vessel 1. An outlet port is shown at 12 and this is the annular inlet to the wind tunnel (not shown). A sliding plug 10 closes the outlet from the pressure vessel 1 by contact with an 'O' ring seal 29. The sliding plug 10 is supported by a mounting which comprises a carrier 14, spacer 16 and flange 15. Flange 15 is attached to the outer wall of the wind tunnel by spider arms (not shown). The sliding plug 10 is hollow having an internal chamber designated 2. This chamber 2 is bounded at the rearward end by a wall 26 which is fixed within the plug mounting. Thus chamber 2 has an enclosed volume which is variable according to the lateral position of the sliding plug 10. To the rear of the wall 26 the carrier 14 defines a second chamber designated 3 and chambers 2 and 3 are linked by a passage 17 which extends through wall 26. Attached to the sliding plug 10 within the chamber 2 is a slider 20 which supports a cylindrical choke portion 22 and a flange 19. Movement of the plug 10 causes the slider 20 to travel axially through the passage 17. Within the passage 17 is located a slide valve 18. Valve 18 is movable between two lateral extreme positions by pneumatic actuation initiated by a controller 25. At the right hand extreme of its movement (as illustrated in FIG. 1) the slide valve serves to isolate chambers 2 and 3 when the plug 10 is at the left hand extreme of its movement. Once the slide valve 18 is moved from the right hand extreme it breaks the seal between chambers 2 and 3. A seal 21 bears upon flange 19 when the valve is in the right hand position. The forward (left hand) limit of movement of the plug 10 is defined by an abutment 23 on the mounting and by a flange 24 at the rear of the plug. At this position the forward end of the plug penetrates into the pressure vessel 1 5 cm beyond the ring seal 29. The rearward limit of movement of the plug 10 is defined by an annular disc 27 which abuts the internal face of the forward wall of the plug. Disc 27 is affixed to a spacer 28 and the latter attached to the plug mounting. Alternative spacers 28 are available to vary the extent of the rearward movement of the plug 10.

The operation of the valve is as follows. Firstly the chambers 2 and 3 are pressurised with gas from a supply means 31. At this stage there is no signific counter force upon the plug 10 because the pressure vessel 1 is unpressurised. Accordingly the plug 10 moves forward to the position shown in FIG. 1 in which it closes the pressure vessel 1, under the action of the internal pressure. When chambers 2 and 3 are pressurised sufficiently to close the valve the slide valve 18 is caused to move to the right to seal chamber 2 and isolate it from chamber 3. Then chamber 2 is further pressurized to a predetermined degree to resist the anticipated pressure in the pressure vessel. Chamber 3 may be evacuated if required at this stage. Also the gas used for pressurising chamber 2 for the further preparation may be different to that used for the initial pressurisation.

Within the pressure vessel 1 a pneumatically driven piston causes compression of the driven air. The build up of pressure exerts a force upon the plug 10 but this force is resisted by that caused by the pressure within chamber 2. When the pressure within the presure vessel 1 reaches a desired level the valve is triggered. Two modes of triggering are available. The first of these is the self-triggering mode in which the slide valve remains in the right side position shown in FIG. 1. In this mode the opening sequence of the valve is initiated directly by increase of pressure in the pressure vessel 1 to a level sufficient to cause movement of the plug against the internal pressure forces. For this mode the seal between chambers 2 and 3 is broken by movement of the flange 19 when the plug 10 starts to slide to the right.

Figure 2:
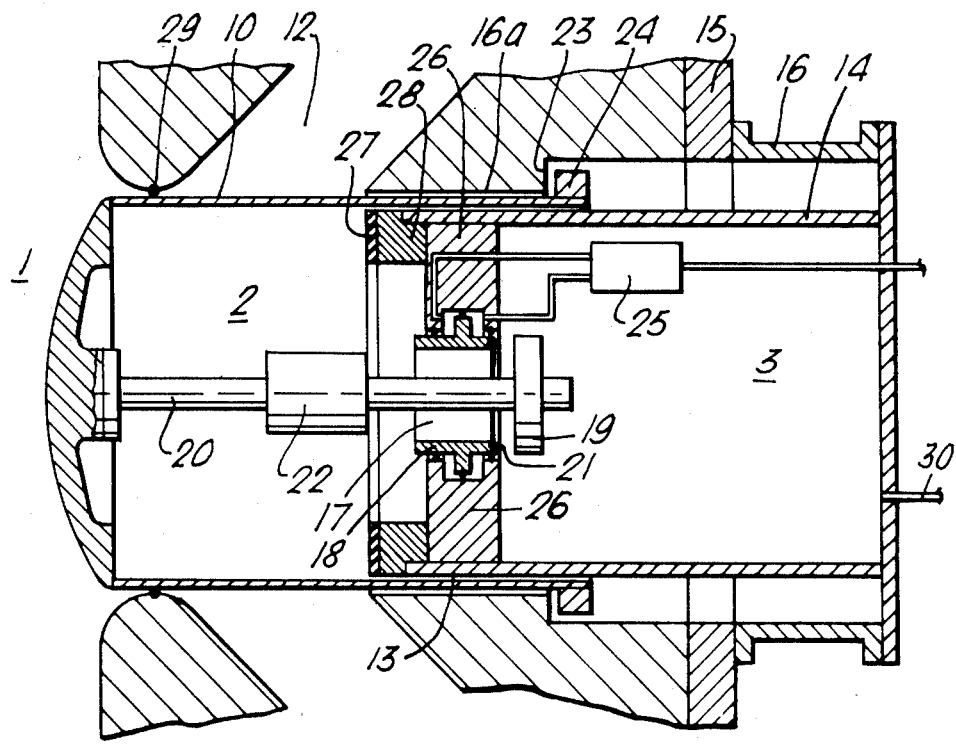
FIGS. 2 through 5 illustrate the operating sequence of the valve shown in FIG. 1, from the completely closed position shown in FIG. 2 to the fully open, rest position shown in FIG. 5.
Figure 3:
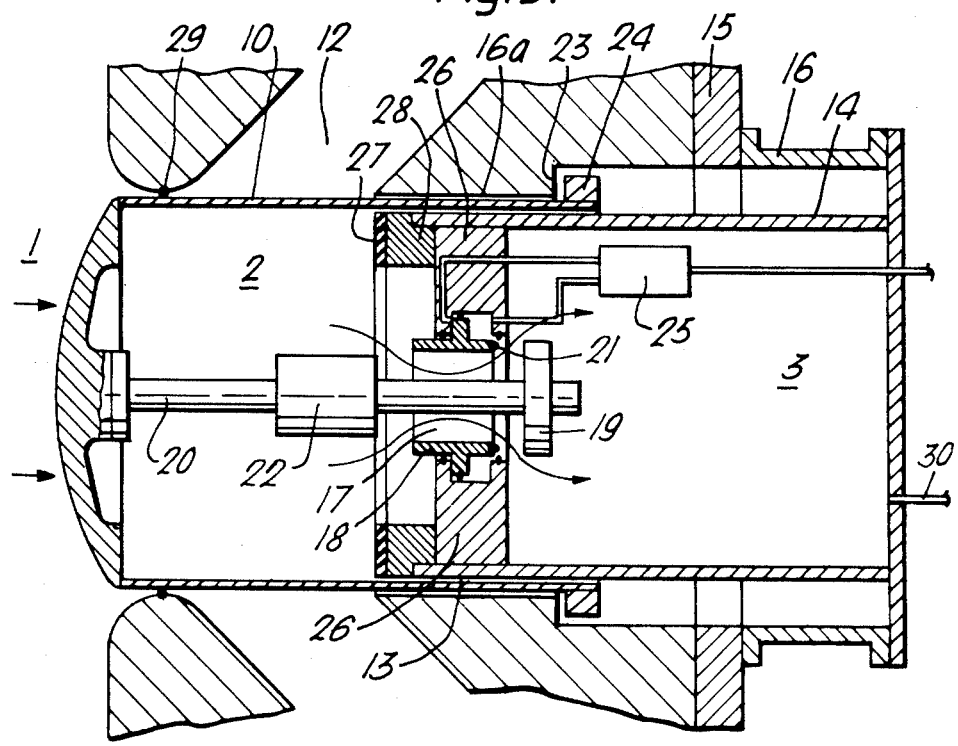
Figure 4:
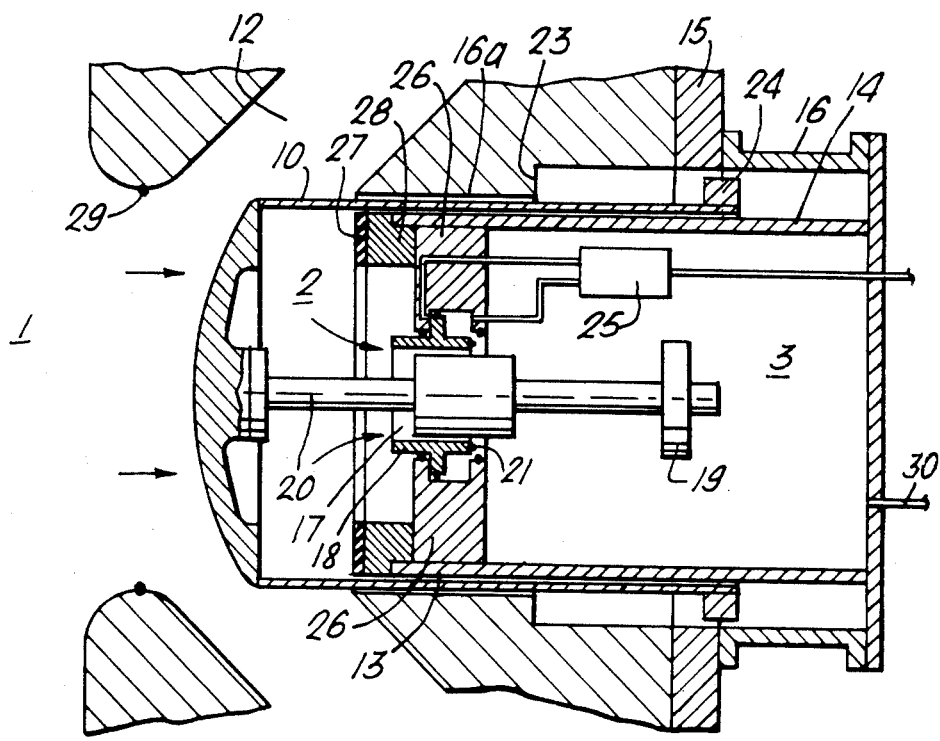
Figure 5:
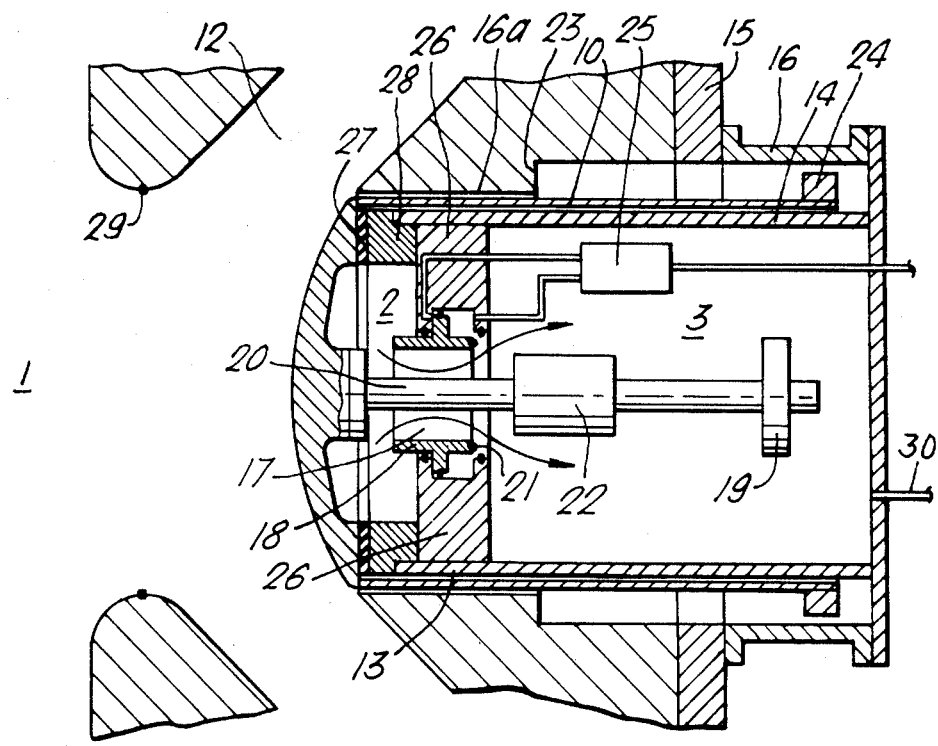

The second mode is an external triggering mode which differs from that described above in that the seal between chambers 2 and 3 is broken by movement of the slide valve 18 towards the left under the actuation of the controller 25. This actuation is given when the output of a pressure transducer 32 indicates that the pressure in the pressure vessel 1 has reached the desired level. Other forms of actuation thresholds could be used eg triggering by sensing the position of the pneumatic piston in the pressure vessel 1. The external triggering mode is that illustrated in FIGS. 2 through 5. In FIG. 2 the plug 10 is still at the forward limit of movement and the plug 10 still seals the pressure vessel 1. On movement of the slide valve 18 it breaks the seal with flange 19 and the gas from chamber 2 flows through passage 18 into the chamber 3 because of the pressure difference between the chambers. When the pressure in chamber has dropped sufficiently the plug 10 moves to the right in response to the pressure in the pressure vessel 1. As this movement takes place the movement of the flange 19 opens yet further the passage 17 and causes less obstruction to the gases flowing from one chamber to the other. This is the stage illustrated in FIG. 3. The decrease in pressure in chamber 2 permits rapid acceleration of the plug 10 towards the right. The motion of the plug 10 causes it to open the passage between the pressure vessel 1 and the outlet 12. Because of the initial penetration of the plug 10 into pressure vessel 1 beyond the 'O' seal 29, the plug 10 has accelerated considerably from rest before the seal is broken and the passage opened. The rightward motion of the plug 10 continues under substantially steady acceleration whilst the passage 18 remains unobstructed. As the motion continues the position illustrated in FIG. 4 is reached in which the choke portion 22 of the slider 20 substantially obstructs the passage 17. This obstruction of flow persists for so long as any part of the choke portion 22 remains within the passage 17 and it leads to a build up of pressure within chamber 2 caused by the motion of the plug 10 and this increased pressure is able to substantially decelerate the plug 10. The configuration is such that the valve is well open before plug deceleration is commenced. Further motion of the plug 10 takes the choke 22 clear of the passage 17 into chamber 3 and full flow through the passage 17 is resumed. This is the position illustrated in FIG. 5. This resumption of flow permits final dumping of the pressure in chamber 2 as the plug 10 approaches the stops. At this moment the pressure in chamber 3 may also be released through a vent 30. These measures are intended to minimise shock and rebound in the valve operation.

The valve may be tuned to operate most effectively for the desired parameters by adjusting the positions of the flange 19 and choke portion 22 on the slider 20. The slider 20 may be screw threaded for this reason. The length of the choke portion 22 also affects this tuning and chokes of alternative lengths or shapes may be substituted. The flow of gas between chambers 2 and 3 is influenced by the pressure differential but is also influenced by the velocity of sound in the particular gas used for pressurising chamber 2 at least.

The following dimensions and data apply to the particular embodiment of the invention currently adopted for use, they are:

plug diameter 0.35 m; plug travel 0.25 m
plug travel before opening of seal 5 cm;
plug transit time 0.14 seconds effective opening time 0.07 seconds; maximum plug velocity 4.5 m/second; plug impact velocity 0.5 m/second. It has been found that the valve will operate satisfactorily with pressure differentials of up to 12 atmospheres. In operation of the valve the initial pressurisation of chambers 2 and 3 is performed using compressed air. Subsequent pressurisation of chamber 2 is by helium. Chamber 3 can be evacuated prior to opening the valve to yield maximum opening speed. Chamber 3 serves the basic function of permitting a controlled balancing of the pressure differential across the passage 17 and hence enables control of the velocity of the plug 10. This chamber also isolates the back pressure from pressures in the surrounding wind tunnel and isolates the wind tunnel from the discharge of the valve.

The description given above is one specific embodiment and should not be taken to limit unduly the scope of the invention as defined in the appended claims. The valve described herein is operated by gases and controls the release of a gas but there seems no reason why the same mode of operation will not be effective using other fluids.

We claim:

1. A fast opening valve having an opening movement driven by inlet pressure, comprising an inlet port, an outlet port, a valve passage linking said ports, a plug, a plug mounting which permits movement of the plug to and fro between a forward position thereof in which the plug closes the valve passage and a rearward position in which the plug lies clear of the valve passage on the outlet port side thereof, a wall member which is fixed in relation to the plug mounting, a chamber with the plg which defines in combination with the wall member a pressurizable compartment having an enclosed volume which increases as the plug moves from the rearward to the forward position, a discharge passage leading from the pressurizable compartment, a closure means operable to seal the discharge passage and thereby the pressurizable compartment, a pressurization means operable to introduce fluid into the pressurizable compartment under pressure and thereby to cause forward movement of the plug to its forward position in the absence of valve inlet pressure said closure means being opeably linked to movement of the plug to the extent that movement of the plug from the forward position opens the discharge passage to allow exit of said fluid from the pressurizable compartment, a receiving chamber at the outlet of the discharge passage rearward motion of the plug under the impetus of valve inlet pressure causing said fluid to exit from the pressurizable compartment through the discharge passage to the receiving chamber, and a choke means operable to restrict exit of fluid from the pressurizable compartment through the discharge passage as the plug nears the rearward position thereby to decelerate the plug.

2. A fast opening valve as claimed in claim 1 in which the closure means and choke means are operable by a slider linked to the plug.

3. A fast acting valve as claimed in claim 2 in which the closure means is a flange located on the slider and in which the choke means is a cylindrical collar on the slider, the slider and the collar thereon being movable through the second passage.

4. A fast acting valve as claimed in claim 3 in which the second passage is defined by a through bore of an annular member which member constitutes a slide valve engageable with the flange to close the second passage, whereby motion of the annular member out of engagement with the flange and in response to an actuating force precipitates the opening of the valve by release of pressure from the first chamber.

5. A fast acting valve as claimed in claim 4 comprising a pressure transducer and a fluid activator arranged so that the fluid activator provides said actuating force to the annular member when the pressure sensed by the pressure transducer equals or exceeds a predetermined level.

6. A fast acting valve as claimed in claim 4 in which there is a vent means for the second chamber.

7. A fast acting valve as claimed in claim 3 in which the position of the collar on the slider is adjustable.

8. A fast opening valve as claimed in claim 1, having a sealing member located within the valve passage and affixed thereto, the plug being engageable with the sealing member thereby to close the valve passage, the configuration being such that the plug in the forward position thereof projects from the outlet port side into the valve passage and beyond the sealing member whereby the valve passage remained closed by contact between the plug and the sealing member for a portion of its rearward motion from the forward position, and said closure means being so operably linked to the movement of the plug that it opens on commencement of the plug's rearward movement thereby permitting exit of fluid from the pressurizable compartment prior to the opening of the valve, the combination of these features enabling acceleration of the plug prior to the opening of the valve.

* * * * *